2,706,688

ASPHALT EMULSION

Harry J. Sommer, Lafayette, and Raymond L. Griffin, Oakland, Calif., assignors to Shell Development Company, San Francisco, Calif., a corporation of Delaware No Drawing. Application March 25, 1950, Serial No. 152,000

3 Claims. (Cl. 106—83)

This invention relates to asphalt emulsions. More particularly, it is concerned with asphalt emulsions suitable for use for soil impermeabilization.

Asphalt emulsions of a great variety have been produced by the use of emulsifying agents to give compositions having a wide variety of fluidity. One of the prominent uses of such emulsions is in the impermeabilizing of porous ground structures. Other means currently employed for impermeabilization is to inject water-glass solutions and coagulate them by such means as simultaneous injection of calcium chloride. Small amounts of sodium silicate have been employed in asphalt emulsions but only in amounts to function as the dispersing or emulsifying agent.

In the injection of asphalt emulsions into the ground, a number of technical difficulties arise which are not subject to ready solution. It has been found that extremely finely divided emulsions are highly desirable for this purpose. However, due to outside influences or to the interaction of various ingredients of the emulsions, pellet formation often occurs so that particle size is materially increased in the emulsion. Pellet formation prevents the deep impregnation of finely divided soils such as sands or silts and hence limits the use of this process in many cases.

It has also been found necessary, due to the stability of the emulsions, to add coagulants immediately prior to ground injection. This naturally is a disadvantage where field operations should be as simple as possible. Furthermore certain asphalt emulsions are so viscous as to prevent their diffusion throughout the soil. This necessitates injection at a number of points in the structure being treated.

Sodium silicate solutions do not have the above disadvantages. However, it has been noted that, upon formation of silica hydrogel from such solutions, a substantial amount of syneresis occurs causing shrinkage of the gel structure. The effect of the shrinkage in a protected location, such as a subsoil, may not be immediately apparent. However, over an extended period of time shrinkage of the gelled particles results in pockets being formed which, in effect, permit leakage through the treated structure. Another disadvantage which the water-glass treatment entails is the tendency for silica gel granules to fracture under vibration. Once fracturing has occurred, granules will not coalesce but will remain as discrete particles.

It is an object of the present invention to improve the properties of asphalt emulsions. It is another object of the present invention to provide an improved asphaltic emulsion for use in the impermeabilizing of porous earth structures and the manufacture of stabilized earth compositions. It is a further object of this invention to provide an improved process for impermeabilizing porous structures. Other objects will become apparent from the following description of the invention.

Now in accordance with this invention it has been found that asphalt emulsions containing substantial amounts of an inorganic salt capable of forming a silica and/or silicate hydrogel are superior and especially effective for use in impermeabilizing soils and the like. More particularly, it has been found that asphalt emulsions which contain silica in an asphalt to silica ($SiO_2$) weight ratio of 1.8:1 to 8:1 and which have an asphalt to total emulsion weight ratio of from 1:12.5 to 4:10 are especially useful. Still more particularly, it has been found that asphalt emulsions which have an asphalt to silica ($SiO_2$) weight ratio of 3:1 to 6:1 and an asphalt to total emulsion weight ratio of from 1:10 to 3:10 give superior results when used to impermeabilize and/or stabilize soils and the like.

Still in accordance with the present invention it has been found that soil compositions, comprising a soil stabilized by the presence of both asphalt and silica and/or silicate hydrogel in proportions and amounts as discussed hereinafter, are substantially permanently impermeable to water and are useful for the manufacture of forms, cores and the like.

The asphalt emulsions with which this invention is concerned comprise asphalt as the dispersed phase and, as the continuous phase, an aqueous solution of an inorganic salt capable of yielding silica, and/or silicate hydrogel. Salts especially useful for this purpose are the water-soluble alkali metal silicates and include sodium and potassium silicates. The asphalts useful for the subject purpose are preferably of the paving grade having a penetration between 40 and 300 as determined by A. S. T. M. Test No. D5-25 "Penetration of Bituminous Materials." Straight run asphalts are preferable, but asphalts from cracking operations or blown asphalts may be employed either singly or in any suitable combination. Flasher bottoms asphalts, solvent extract asphalts and solvent extracts are also useful. Tests have been made on asphalts derived from Mid-Continent, Texas, Gulf and California crude and all have been found useful for the present purpose.

The aqueous phase of the asphalt emulsions of the invention contains a water-soluble alkali metal silicate and/or salts capable of forming silica and/or silicate hydrogel, such as the commercial water-glass solutions. The commercially available water-glass solutions contain various molar ratios of $SiO_2$ to $Na_2O$. While many of the several commercial grades can be used, it is preferred to employ those having relatively high silica contents. Preferably, the molar ratio of silica ($SiO_2$) to sodium oxide ($Na_2O$) should be above 2.5:1 and preferably is above 3.0:1. The commercially available water-glass solutions which may be used for this purpose usually have a gravity of about 37–40° Bé. or higher and contain at least 35–45% sodium silicate. (Total sodium oxide and silica.)

Other ingredients ordinarily present in the emulsions include emulsifying agents; these emulsifying agents may be of the anionic, cationic, cationic-anionic or non-ionic type. A soap type (anionic) emulsifying agent is preferred when alkaline asphalt emulsions are to be used. The types of soaps found to be especially effective are those containing an alicyclic nucleus, such as the sodium or potassium soaps of petroleum hydrocarbon-insoluble pine wood resins. Another suitable type of emulsifying agent comprises alkaryl sulfonates as exemplified by sodium alkylated toluene sulfonates. A particularly effective species of this variety is the sodium salt of a toluene sulfonate which has been alkylated with an ethylene or propylene tetramer. When acid asphalt emulsions are used, high molecular weight amine salts, such as the primary, secondary and tertiary amine salts, quaternary ammonium salts or polyamine salts have been found to be effective emulsifying agents (cationic type). When used in the manner described hereinafter, none of these types of emulsifiers is adversely affected by the presence of silicates or other ingredients present in the asphalt emulsions. These emulsifying agents are ordinarily present in an amount of from about 0.5% to about 4% based on the weight of the asphalt. Non-ionic types of emulsifiers may be employed, such as sorbitan mono-oleate, polyoxy ethylene oleate, etc., as well as cationic-anionic emulsifiers.

Other ingredients which may be present include stabilizers, such as casein, albumin and the like. But a particular advantage of the present compositions is that the necessity for stabilizers is ordinarily not present. The organic stabilizers, such as casein, have been found to decompose due to soil bacterial action, therefore, restricting the use of asphalt emulsion stabilizers therewith. However, while their use is ordinarily to be avoided, they may be employed if necessary.

In accordance with the present invention, it has been found that outstanding results are obtained if the weight ratio of asphalt to silica is restricted to the preferred range 3:1 to 6:1. If the silica proportion of the emulsion, based on the above-indicated asphalt to silica weight ratios, is greatly increased beyond this range, that is below about a 1.8:1 asphalt to silica weight ratio, and still maintaining the weight ratio of asphalt to total emulsion between the ratios of 1:12.5 and 4:10, friable compositions result upon admixture with soil. This property is undesirable when soil stabilization is the primary object.

In order to allow for normal temperature fluctuations, vibrations and other influences, it is highly desirable to obtain soil compositions which will not fracture under strains of these types. A reason for maintaining the silica proportion within the above-preferred range is that syneresis increases sharply as the proportion of silica is increased. Hence, excessive and undesirable shrinkage of the coagulated emulsion can be normally expected if unduly high amounts of silica are present. When asphalt and silica are used in the amounts indicated by the ratios set forth hereinbefore, syneresis is depressed to a point where shrinkage becomes a negligible factor.

Examination of soil compositions wherein the asphalt proportion of the asphalt to silica weight ratio is substantially increased beyond the preferred 6:1 ratio, that is above about 8:1, shows that the advantages to be gained from the combination are not obtained when only a relatively minor amount of silica is present or conversely when a high proportion of asphalt is used. The silica hydrogel formed therefrom is weak and easily displaced from soil by water, resulting in a permeable soil formation and insufficient stabilization.

Still another qualification which the subject asphalt emulsions must possess is that the proportion of asphalt therein must not be too little nor too great; the proportion of asphalt to the total emulsion must be within the weight ratios of 1:12.5 to 4:10, that is, between 8% to 40% by weight asphalt. It is preferred that the asphalt to total emulsion weight ratio is within 1:10 to 3:10 ratios. It has been found that if the asphalt proportion is substantially reduced below the preferred 1:10 ratio, that is, below about 1:12.5, weak silica hydrogel results and causes insufficient and incomplete sealing. If the asphalt proportion is substantially increased above the preferred 3:10 ratio, that is, above about 4:10, the asphalt emulsion becomes too heavy to completely permeate finely packed soils and uneven deposition occurs which causes incomplete shut-off.

The methods well known in the art may be employed for the preparation of emulsions described above. The rate and manner in which the emulsions break with the resultant formation of silica and/or silicate hydrogels depend largely upon the silica concentration, temperature and the pH of the emulsion together with the type of emulsifying agent. Thus, an increase in concentration of silica, calculated as $SiO_2$, in the emulsion increases the rate of gel formation. However, for the reasons described hereinbefore, it is desired to maintain the silica concentration within certain critical limits as set forth above. Similarly, an increase in temperature increases the rate of gel formation (gelation). For obvious practical reasons it is preferred to employ the subject asphalt emulsions at temperatures at which they are reasonably fluid and easily handled and transferred, usually an ambient atmospheric temperature, generally between the temperature range of from about 35° F. to about 150° F.

With reference to the influence of pH together with the type of emulsifying agent used upon gel formation when sodium soaps of petroleum-hydrocarbon-insoluble pine wood resins are employed as the emulsifying agent in the subject asphalt emulsions, specifically considering an asphalt emulsion wherein the asphalt to silica weight ratio is about 2:1 and wherein the asphalt to total emulsion weight ratio is about 1.5:10, the pH of this particular emulsion should be higher than 10.2 and lower than 11.3 in order to insure the emulsion breaking in a period between 30 minutes and 48 hours. An asphalt emulsion of the above composition with a pH value below 10.2 may result in immediate gelation. If on the other hand, the pH of the above-described emulsion is above 11.3, gelation may be postponed indefinitely and the emulsion remains stable for a long period of time. This property allows preparation of the asphalt emulsion at a central location, shipping it to a site in an alkaline condition above this critical value of pH and subsequently metering into the injection line an amount of acid sufficient to change the pH to the desired value so as to cause coagulation or gelation within a desired period of time. Optimum results are obtained for an emulsion of the above-described composition when the pH is between 10.7 and 11.0 since this condition allows time for the emulsion to be properly injected and insures gelation within a reasonable time interval thereafter. In general asphalt emulsions employing sodium soap of petroleum-hydrocarbon-insoluble pine wood resins as the emulsifying agent are capable of producing satisfactory gel formation over a wide range of pH value, i. e., from about 1 to about 14, depending upon the silica concentration. It is, however, preferred when using this type of emulsifying agent and wherein a similar type of emulsifying agent (anionic) is used to employ alkaline asphalt emulsions, that is, above a pH value of 7. Considering now acidic asphalt emulsions, for example, asphalt emulsions wherein cationic emulsifying agents are used, such as hereinbefore described amine and quaternary ammonium salts, these asphalt emulsions are also capable of producing satisfactory gel formation over a relatively wide range of pH value. However, for most purposes of the invention, depending upon the silica concentration and especially when high molecular weight amine salts are employed as the emulsifying agents, it is preferred to employ acidic asphalt emulsions, that is with a pH range of from about 2 to about 6.5.

As pointed out hereinbefore, the concentration of silica in the emulsion and the temperature of the emulsion influence the rate of gelation in addition to the influence of pH together with the emulsifying agent. Accordingly, gelation time for a particular asphalt emulsion may be decreased or increased, or postponed indefinitely, by varying these factors. Thus, gelation time of an asphalt emulsion may be decreased by an increase in silica concentration and/or emulsion temperature or increased and/or postponed indefinitely by a decrease in silica concentration and/or emulsion temperature. However, in order to obtain satisfactory results when these emulsions are used to impermeabilize soil, the hereinbefore described critical weight ratios should not be exceeded. Also gelation time of the above-described asphalt emulsions may be postponed indefinitely by the use of compounds known as "retarders" which serve to retard gelation. Examples of retarding agents for the above purpose for use in asphalt emulsions of the invention are glycerol (depending upon the pH of the emulsion), dulcitol, water-soluble cellulose ethers, polyhydric alcohols, starches, etc.

The optimum time required for gelation of the subject emulsions, specifically when admixed or injected into pervious earth masses, depends upon a number of conditions all of which are usually determined by the characteristics of the earth mass and to a certain extent by the time and equipment available. For example, when large earth masses are to be impermeabilized it is desirable to cause gelation therein at a uniform rate so as to prevent premature blocking therein before all the pervious earth mass has been contacted with the asphalt emulsion. Thus, in the above situation a relatively long gelation time, a matter of hours, 1 to 6 hours or perhaps even a day, is desirable. Similarly, for small earth masses or earth masses which contain rapidly percolating or flowing water, it may be preferable to employ an asphalt emulsion whose pH has been adjusted to obtain a relatively fast rate of gelation, ½ to 2 hours.

Acids which may be used to reduce the pH of an alkaline emulsion are not restricted to mineral acids alone. Lower molecular weight fatty acids are useful, each as acetic acid. An efficient material for this purpose is liquid sulfur dioxide which may be conveniently metered into the injection line. Other acid acting agents may be used, for example, alkali acid phosphates, carbonates, etc.

Various methods have been found in accordance with one phase of the present invention for the preparation of fluid and stable acid emulsions. One method comprises dispersing a cationic surface-active agent, such as a high molecular weight primary, secondary or tertiary amine or a polyamine, especially a primary amine, such as an alkyl amine wherein the alkyl group of said alkyl amine contains at least 10 carbon atoms in asphalt and subsequently emulsifying the resulting admixture with an acidulated aqueous solution of a surface-active amine salt, such as a lower fatty acid salt (acetate) of an above-described amine. By another method asphalt may be emulsified in an aqueous solution containing a minor amount, between 0.5% and 4% by weight of asphalt preferably from 2% to 4% by weight of asphalt, of a surface-active amine salt of a lower fatty acid, such as an alkylamine salt wherein the alkyl group of said alkyl amine contains at least 10 carbon atoms. Asphalt emulsions made under these conditions (that is containing a cationic surface-active emulsifying agent) have been found to be not only stable but also fluid, two conditions highly desirable for compositions to be used in soil stabilization or impermeabilization. If said surface-active amine salt, such as a higher fatty amine acetate is added to only one of the two phases (asphalt and water) below the above indicated critical amounts, the emulsions so formed are coarse and unstable depending upon the concentration of the surface-active agent.

In addition, it has been found that these emulsions such as those just described (containing a cationic type emulsifying agent) may be modified by the addition of any desirable amount of sodium silicate within the weight ratios of the invention as set forth hereinbefore so long as the pH is maintained within the range from about 2.0 to 6.5 depending upon the SiO₂ concentration and still give suitable hydrogels for the purposes of the invention. Preferably, however, the pH should be between 5.0 and 6.0. Also asphalt emulsions containing sodium silicate solution and containing a cationic type emulsifying agent, such as a surface-active amine salt dispersed in both phases, have the peculiar property of forming gels which are stable even when heated at relatively high temperatures. That is, these emulsions produce gels of a unique structure such that the asphalt contained therein is firmly entrapped and retained. Gels formed from asphalt emulsions containing anionic and non-ionic emulsifying agents on the other hand tend to readily release the asphalt therein, such as upon application of heat. Hence it is possible to make plastic soil compositions which may be subjected to heating such as is necessary for the formation of forms, cores and the like. The mixture is both moldable, firm and plastic and, due to an undetermined cause, remains stable at the temperatures necessary for the formation of molded products. As compared with this, alkaline asphalt emulsions of the invention wherein an anionic emulsifying agent is employed tend to allow the asphalt to melt out when heat is applied to them.

Due to the fluid character of the acid-type emulsions, they may be used in the same manner for soil stabilization as described for the alkaline emulsions. The methods of soil impermeabilization by the use of ordinary asphalt emulsions are known. The same general type of methods may be utilized in the present instance. The following examples illustrate the process and products of the invention.

While water, which is incorporated in the silica-asphalt gel, is an integral part of the soil sealing composition, preferred and typical compositions may be expressed on a dry basis. Thus, the preferred amounts (within the asphalt to silica weight ratios of from 3:1 to 6:1) of the non-aqueous constituents added to a sandy soil containing 25% void spaces and a bulk density of 2.02, comprise 1.33 to 4.82% silica-asphalt, with a corresponding minimum of 0.31% silica and 1.0% asphalt and a corresponding maximum preferred silica content of about .7% and a corresponding maximum preferred asphalt content of about 4.2%. It is to be understood that within these ranges the weight ratios of asphalt to silica and asphalt to total emulsion for the asphalt emulsion employed referred to hereinbefore, are maintained and that the weights of dry ingredients in a given soil will increase with increasing void spaces to be blocked.

Example I

An asphalt emulsion containing 63% asphalt, 35% water and 2% of a sodium salt of a petroleum-hydrocarbon-insoluble pine wood resin is mixed with a water-glass solution containing 21.8% silica and having a silica:sodium oxide molar ratio of 3.2. This solution is 32° Bé. in gravity. 300 parts by weight of the asphalt emulsion were used together with 400 parts of the water-glass solution. The emulsion was diluted further with 390 parts by weight of water. The resulting mixture had a specific gravity of 1.09 and an asphalt to silica weight ratio of 2.10 to 1 and contained 17.3% by weight asphalt. The pH of the unmodified composition was 11.3 and showed no tendency to break on standing. When the pH was reduced to 11.0 by the addition of acetic acid, coagulation occurred after about 48 hours. At pH 10.7, the emulsion coagulated in 47 minutes. Upon reduction to 10.2, gelation occurred immediately.

The pine wood resin salt employed in this example is a salt of a commercial product trade-marked "Vinsol" and obtainable from the Hercules Powder Company. The resin is understood to be at least about 85% by weight insoluble in petroleum hydrocarbons such as gasoline.

Example II

An emulsion prepared as described in Example I was introduced into a porous soil under pressure. The pH of the emulsion was previously adjusted to 10.7. After one hour the coil had set to what appeared to be a solid mass which was impervious to water. Other emulsions prepared as described above, but containing over 40% asphalt by weight based on the total emulsion, were used in the treatment of the same type of soil. It was found upon examination that after the impregnation took place bands of fluid and asphalt formed rather than a uniform gel structure as in the case of the first composition.

Example III

Primary alkyl amines containing a mixture of C₁₄ to C₁₈ alkyl groups were dispersed in asphalt to form an admixture containing about 1% by weight of said alkyl amines based on asphalt. This admixture was emulsified with an aqueous solution containing 1% by weight of an acetic acid salt of said amines and containing an amount of acetic acid sufficient to neutralize the C₁₄ to C₁₈ alkyl amines dispersed in the asphalt. Subsequently 32° Bé. waterglass solution was added thereto together with additional acetic acid to form a stable, fluid emulsion having a pH of about 5.7 and an asphalt:silica weight ratio of 4:1. It was found that the resulting emulsion coagulated in about 70 minutes. When mixed with sand the resulting said composition was plastic and remained stable in structure even when heated on a hot plate, no asphalt separating therefrom.

The primary object of the present compositions is for impermeabilizing soil structures. They also may be employed for the cementing of oil wells, in the preparation of foundry cores, roofing slats, underwater coatings and hydrocarbon resistant seals. The structures may be modified by the presence of other inorganic oxides preferably in amounts less than about 10% by weight of the silica present in the composition. Other suitable oxides include alumina, magnesia, calcium oxide, barium oxide, chromic oxide, zinc oxide, titanium oxide, and other well known gel-forming substances.

This invention is a continuation-in-part of our copending patent application, Serial No. 94,726, filed May 21, 1949, now abandoned.

We claim as our invention:

1. As a new composition of matter, an asphalt-containing emulsion consisting essentially of a continuous phase and a dispersed phase, said continuous phase consisting essentially of silica hydrogel and said dispersed phase consisting essentially of asphalt, the weight ratio of asphalt to silica being between 1.8:1 to 8:1, the weight ratio of dispersed asphalt in the said emulsion being from 1:12.5 to 4:10, said emulsion containing as a dispersing agent a minor but effective emulsifying amount of a lower fatty acid salt of an alkyl amine, said alkyl amine having an alkyl radical of from about ten to about 18 carbon atoms, said salt being dispersed in both phases of the emulsion, and said emulsion having a pH within the range of from about 2.0 to about 6.5.

2. As a new composition of matter, an asphalt emulsion consisting essentially of a continuous phase and a dispersed phase, said continuous phase consisting essentially of silica hydrogel and said dispersed phase consisting essentially of asphalt, the weight ratio of asphalt to silica being between 3:1 to 6:1, the weight ratio of asphalt in said emulsion being from 1:10 to 3:10, said emulsion containing as a dispersing agent a minor but effective emulsifying amount of a lower fatty acid salt of an alkyl amine, said alkyl amine having an alkyl radical of from about 10 to about 18 carbon atoms, said salt being dispersed in both phases of the emulsion, and the emulsion having a pH within the range of from about 2.0 to about 6.5.

3. As a new composition of matter, an asphalt emulsion consisting essentially of a continuous phase and a dispersed phase, said continuous phase consisting essentially of silica hydrogel and said dispersed phase consisting essentially of asphalt, the weight ratio of asphalt to silica being about 4:1, and the weight ratio of asphalt in said emulsion being from 1:10 to 3:10, said emulsion containing as a dispersing agent a minor but effective emulsifying amount of a lower fatty acid salt of an alkyl amine, said alkyl amine having an alkyl radical of from about 10 to about 18 carbon atoms, said salt being dispersed in both phases of the emulsion, and said emulsion having a pH within the range from about 2.0 to about 6.5.

References Cited in the file of this patent

UNITED STATES PATENTS

| | | |
|---|---|---|
| 882,891 | Kelly | Mar. 24, 1908 |
| 1,206,056 | Vail | Nov. 28, 1916 |
| 1,734,437 | Kirschbraun | Nov. 5, 1929 |
| 1,787,338 | Clapp | Dec. 30, 1930 |
| 1,988,336 | Roediger | Jan. 15, 1935 |
| 1,989,775 | Smith | Feb. 5, 1935 |
| 2,175,767 | Torri | Oct. 10, 1939 |
| 2,197,843 | Leeuwen | Apr. 23, 1940 |
| 2,258,829 | Van den Berge et al. | Oct. 14, 1941 |
| 2,378,235 | Miles | June 12, 1945 |
| 2,437,387 | Hodgson | Mar. 9, 1948 |
| 2,568,849 | Fasold et al. | Sept. 25, 1951 |

FOREIGN PATENTS

| | | |
|---|---|---|
| 386,158 | Germany | 1923 |
| 268,411 | Great Britain | 1931 |
| 2,185 | Australia | 1931 |
| 808,633 | France | 1937 |